(12) United States Patent
Gros D'Aillon et al.

(10) Patent No.: US 8,421,025 B2
(45) Date of Patent: Apr. 16, 2013

(54) RADIATION DETECTION DEVICE

(75) Inventors: Eric Gros D'Aillon, Brie et Angonnes (FR); Marie Ruat, Termes (FR); Loïck Verger, Grenoble (FR)

(73) Assignee: Commissariat A l'Energie Atomique, Paris (FR)

( * ) Notice: Subject to any disclaimer, the term of this patent is extended or adjusted under 35 U.S.C. 154(b) by 392 days.

(21) Appl. No.: 12/690,252

(22) Filed: Jan. 20, 2010

(65) Prior Publication Data

US 2010/0213382 A1    Aug. 26, 2010

(30) Foreign Application Priority Data

Feb. 26, 2009   (FR) ...................................... 09 00875

(51) Int. Cl.
*G01T 1/24* (2006.01)
(52) U.S. Cl.
USPC ..................................................... 250/370.09
(58) Field of Classification Search ............. 250/370.09, 250/370.12
See application file for complete search history.

(56) References Cited

U.S. PATENT DOCUMENTS

| 5,889,313 | A * | 3/1999 | Parker ........................... 257/429 |
| 7,127,027 | B2 * | 10/2006 | Hoffman ........................ 378/19 |
| 7,256,402 | B1 * | 8/2007 | Lee ........................... 250/370.09 |
| 7,291,842 | B2 * | 11/2007 | Zentai et al. ............. 250/370.09 |
| 2003/0010942 | A1 | 1/2003 | Kuwabara |
| 2004/0238743 | A1 * | 12/2004 | Gravrand et al. .......... 250/338.4 |
| 2007/0001122 | A1 | 1/2007 | Gros D'Aillon et al. |
| 2007/0007463 | A1 | 1/2007 | DeGeronimo |

FOREIGN PATENT DOCUMENTS

| EP | 1 674 887 A2 | 6/2006 |
| FR | 2 887 993 A1 | 1/2007 |

OTHER PUBLICATIONS

Marie Ruat et al., "*3D Semiconductor Radiation Detectors for Medical Imaging: Simulation and Design*," IEEE Nuclear Science Symposium Conference Record, Oct. 19, 2008, pp. 434-439.

* cited by examiner

*Primary Examiner* — Constantine Hannaher
(74) *Attorney, Agent, or Firm* — Burr & Brown

(57) ABSTRACT

This device for the detection of ionizing radiation includes a stack integrating a first set of electrodes (1), a solid detector material sensitive to ionizing radiation (2), capable of interacting therewith by releasing electron and electron hole mobile charge carriers, and a second set of electrodes (3), said first and second sets of electrodes being polarized in such a way that an electric field is applied through the detector material (2), thereby allowing the charge carriers generated by the interaction between the detector material and the ionizing radiation to migrate. It further includes electrically insulated electrodes (41-44), known as non-collecting electrodes, and positioned in the volume of the detector material (2) subjected to the electric field, and capable, by capacitive effect, of detecting the charges induced by the migration of the charge carriers in the volume of the detector subjected to the electric field.

16 Claims, 9 Drawing Sheets

RADIATION DETECTION DEVICE

FIELD OF THE INVENTION

The present invention relates to a device for the detection of ionizing radiation, particularly where this means charged particles or electromagnetic waves. Such a device is commonly used, first of all and with the prime aim of detecting said type of waves and particles for scientific or medical purposes in particular, and then to form images of some parts of an object from the rays transmitted through or diffused or diffracted by said object after irradiation, in order for example to analyze the chemical composition of said object. Another aim of this device is to make images or take measurements by spectrometry.

BACKGROUND OF THE INVENTION

To form images, there is a known technique, particularly in the field of X- or gamma ray imaging, of using a parallelepiped detection device with two main directions, generally of the matrix type. The two main directions conventionally define a detection plane, in which the detector can be used to locate the point at which the incident radiation interacts with the detector. It is additionally known for such detectors to be used to form digital images, i.e. images encoded in an information-processing bit sequence.

Such a detector generally includes a material that interacts with said incident radiation by releasing mobile electrical charges, and electrodes between which is defined an electric field, that induces the displacement of the released mobile electrical charges. Among these electrodes can be distinguished in general a unitary cathode, forming an equipotential set on the detection plane, and one or more anodes, constituted by a plurality of juxtaposed points or pixels forming a matrix in the detection plane. These electrodes therefore collect said charges constituting the detection signal, and are connected to measurement gages. They are then referred to as collecting electrodes.

Some constituent materials of such detectors do not have good charge carrying properties. Thus, beyond a certain thickness, the charges either do not reach said collecting electrodes, or reach them in too small a number. The signal collected is then either zero, or too weak to be exploited. As a result, the effective thickness of the detector material is limited by the charge carrying properties of said material. Detection efficiency, defined as being the ratio between the number of photons detected and the number of incident photons, is in fact directly dependent on the thickness of said detector material. This efficiency is therefore also limited by the charge carrying properties of the detector material.

Furthermore, it is known that the displacement of a charge carrier cloud, in the vicinity of an electrically insulated electrode, generates by capacitive effect, a charge known as an induced charge in said electrode. This type of electrode is commonly known as a non-collecting electrode. The use of such a non-collecting electrode is known from the prior art.

A detection device has for example been described in the document FR-2 887 993 constituted by a detector material, whereof the opposite faces are connected to a cathode and to an anode network respectively, the latter being constituted by coplanar anodes arranged in lines, known as anode lines. A layer of electric insulator is placed between the anode plane and a network of non-collecting electrodes, in such a way that the collection of a charge on the anode induces a charge in the non-collecting electrodes situated in proximity. In doing this, said device enables the deduction of the position on X and Y, in other words in the two main directions of the detection plane, of the collection in the anode plane, and which also corresponds to the position on X and Y of the interaction with the incident radiation, the charges migrating in a plane parallel to the electric field. The position along the Z-coordinate or interaction depth can be determined by calculating the rise time according to the method described in this document.

It is therefore possible through the use of non-collecting electrodes arranged within or in proximity to an anode network, to determine the coordinates of an interaction in a detector material in a plane perpendicular to the electric polarization field of the collecting electrodes.

However, and as recalled previously, it is known that the mobility, and/or the life cycle of the charge carriers in some detection materials, is low. Thus, when the interaction of the incident radiation with said detector material occurs beyond a certain distance from the polarization electrodes or collecting electrodes, the charge carriers fail to reach a collecting electrode. Thus, in a hypothetical case such as this, the interaction is not detected. The useful thickness of the detector material, in other words that in which interactions give rise to the genesis of charge carriers collected by a collecting electrode, is therefore limited. In doing this, the detection efficiency of such a device proves limited.

BRIEF DESCRIPTION OF THE INVENTION

The objective of the invention is therefore to propose a device for the detection of electromagnetic radiation or charged particles, which has a structure such that the effective thickness of the detection material can be increased in order to bring about improved detection efficiency.

The invention therefore relates to a device for the detection of ionizing radiation that includes a stack integrating a first set of electrodes, a solid detector material sensitive to ionizing radiation, capable of interacting with same by releasing electron and electron hole mobile charge carriers, and a second set of electrodes, said first and second sets of electrodes being polarized in such a way that an electric field is applied through the detector material, thereby allowing the charge carriers generated through the interaction between the detector material and the ionizing radiation to migrate.

According to the invention, the device further includes electrically insulated electrodes, known as non-collecting electrodes, and positioned within the volume of the detector material subjected to the electric field, and intended, by capacitive effect, to detect the charges induced by the migration of the charge carriers in the volume of the detector subjected to the electric field.

These non-collecting electrodes are separated from the detector medium by an electrically insulating layer. The aforementioned capacitive link is thus able to be made between the charges migrating in the detection material, in proximity to the insulating layer, and said electrodes.

Put another way, each of these so-called non-collecting electrodes is connected by capacitive link with a certain volume of the detector located in proximity to the insulating layer.

In doing this, when charge carriers migrate in the detector material, under the effect of the electric field generated between said first and second electrode groups, they are called to pass in proximity to the non-collecting electrodes and the latter detect induced charges by capacitive effect. It therefore becomes possible to collect an induced signal by the migration of the charge carriers inside the detector medium, even if said charge carriers are not collected by said first or second sets of electrodes.

By appropriately selecting the point at which the non-collecting electrodes are implanted in the detector material, it becomes possible to detect the migration of the charge carriers as close as possible to the interaction that has generated them. This detection may be exploited, even though said charge carriers do not reach the electrodes generating the electric field, in other words belonging to the first and second group of electrodes.

In doing this, it becomes possible to use, as detection material, materials known for not having good charge carrying properties, and which had not hitherto been employed on account of their low level of efficiency.

According to the invention, the measurement gages are the terminals of the non-collecting electrodes, to which are connected known prior art devices that enable the signal to be processed (e.g. integrators, pre-amplifiers, meters, multi-channel analyzers, discriminators), read and recorded. Quite clearly, the inventive detector is also able to use the signals collected by at least said first or second groups of electrodes.

According to a first embodiment of the invention, the non-collecting electrodes are arranged parallel to the electric field and have different lengths. In this configuration, the free end of said electrodes is located in the detector material. The other end is connected to a prior art measurement device, for example a pre-amplifier followed by an amplifier and an analog-to-digital converter, or a pre-amplifier followed by a meter, or else an integrating circuit.

According to this embodiment, the non-collecting electrodes may be constituted by a conducting zone constituted by a first narrow and longilinear part, in communication with a second, wider and shorter part that forms the free end of the electrode.

The first part is insulated from the detector material by a good thickness of a first low permittivity insulating material, and the second, so-called end part being insulated from the detector material by a small thickness of a second insulating material, which has a level of permittivity higher than that of the first insulating material.

According to another embodiment of the invention, the non-collecting electrodes are arranged parallel to the polarization electrodes, and therefore perpendicular to the electric field, and in one or more planes parallel to said polarization electrodes.

BRIEF DESCRIPTION OF THE FIGURES

The implementation of the invention and the resulting advantages will emerge more clearly from the following embodiment description, given by way of information and non-restrictively supported by the appended figures wherein.

DETAILED DESCRIPTION OF THE INVENTION

Figure 1:
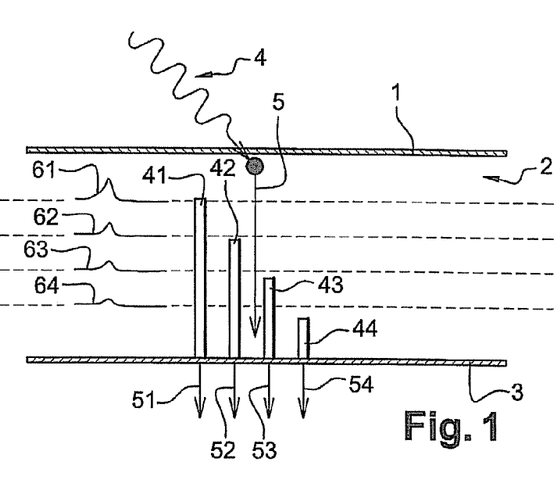
FIG. 1 is a schematic cross-section representation aimed at illustrating the inventive principle according to a first embodiment of an inventive detector.

In FIG. 1 a cross-sectional view of an ionizing radiation detector in accordance with a first embodiment of the invention has been shown schematically.

Basically, this detector includes a stack of a first set of electrodes (1), in the case in point constituted by a unitary cathode, a material sensitive (2) to ionizing radiation, such as for example one made out of an alloy of cadmium, zinc and tellurium (CdZnTe), and a second set of electrodes (3), constituted for example by an anode array. The electrode sets (1) and (3) are polarized so as to create between them, and therefore through the detection material (2), an electric field.

The material constituting the detector itself (2) may also be made out of semi-conductor material such as Si, GaAs, Ge, InP, CIS, of even of semi-conductor polymers. The thickness of said material is typically between a few hundred micrometers and a few millimeters, or even more than that. As already stated supra, detection efficiency is directly related to the thickness of detection material employed.

According to a first embodiment of the invention, a plurality of non-collecting electrodes, in the case in point bearing the reference (41) to (44) are inserted into the detection material (2). Said non-collecting electrodes have different lengths Z1-Z4 respectively, as can be seen in FIG. 1.

They are directed substantially parallel to the electric field generated between the cathode (1) and the anodes (3).

Said non-collecting electrodes are made out of a conductive material, for example a metal, sheathed with a layer of at least one insulating material.

According to a preferred embodiment, a non-collecting electrode comprises a first longilinear part, or channel (30), perpendicular to the plane defined by the anode array, said first part being in contact with a measurement gage (51, 52, 53, 54 in FIG. 1), the contact being able to be established in the plane of the anode array. This first part (30) may be cylindrical or parallelepiped in shape. Where a cylinder is involved, the diameter may be between a few micrometers and 20 micrometers, these values corresponding to the greatest width where a parallelepiped is involved. The length of said first part is variable, as can be seen in FIG. 1.

The anode array may comprise several point, parallelepiped or longilinear anodes according to known prior art arrangements. It may also involve a single surface anode. In this event, it will be passed through by the non-collecting electrodes.

This first conductive part (30) is insulated from the detector material (2) by a thickness of a first insulating material (31), which has low relative permittivity, typically of between 1 and 4, and preferentially close to 2. In the example in FIGS. 2a to 2c, the thickness of said insulating layer (31) is 30 micrometers, the diameter of the conductive material (30) being 10 micrometers.

Figure 2A:
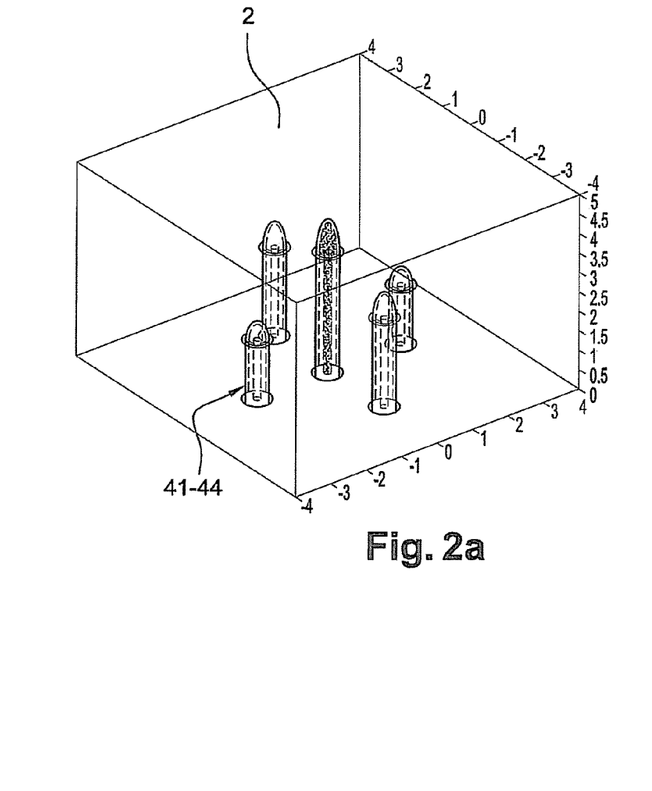
FIG. 2a is a schematic perspective representation of the inventive detector giving more detail of said first embodiment, whereof
Figure 2B:
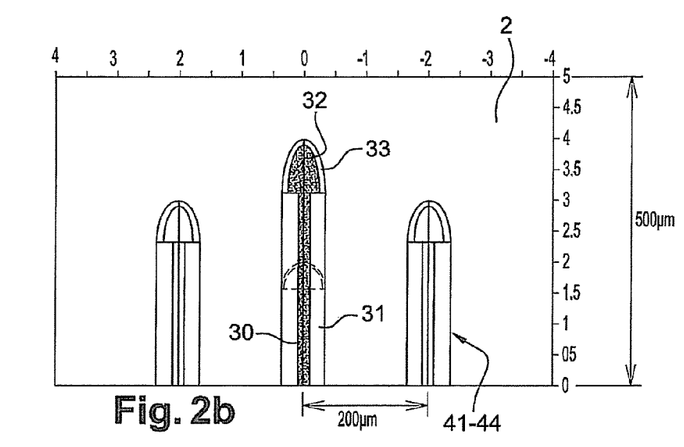
FIG. 2b is a schematic representation in longitudinal cross-section and FIG. 2c a view in transverse cross-section.
Figure 2C:
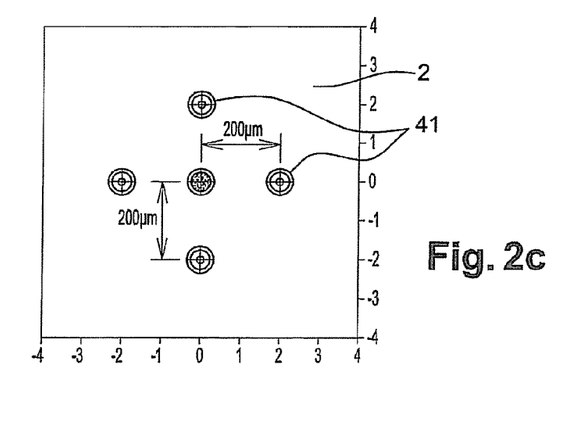

This first part leads to a wider end (32), of short length relative to that of the first part (30), also constituted by a conductive material, for example identical to that constituting the first part. This end (32) is insulated from the detector material (2) by a second insulating material (33).

The dielectric permittivity of this second insulating material is preferentially higher than that of the first insulating material (31), and typically between 4 and 13, and preferably as close as possible to that of the detector material.

This end, or second part, may be cylindrical, parallelepiped, or pyramidal. The length of this second part is generally fixed, whatever the length of the non-collecting electrode concerned. As already indicated, this length is shorter than the length of the channel or first part, and typically a few tens of micrometers. Its greatest width, or its diameter where a cylindrical end is involved, is between a few tens and a few hundreds of micrometers, and typically between 30 and 100 micrometers.

In the example in FIG. 2, the thickness of insulating material (33) at the end (32) amounts to 10 micrometers, i.e. three times smaller than the thickness of the layer of the first insulating material (31).

To obtain an induced charge of significant size, simulations have shown that it was advantageous for the electrode to have the following characteristics:
- a fine conductive channel (30) of variable length, insulated from the detector material (2) by means of a relatively large thickness of a first insulating material (31) of low dielectric permittivity; relatively large is taken to mean a thickness of insulator of more than or close to the diameter (or to the largest width) of the electrode; ideally, the diameter of the fine conductive channel is constant over its entire length; thus, the thickness of insulator is larger around said channel, in comparison with that around the tip.
- a wide end (32) of short length, insulated from the detector material by means of a relatively small thickness of a second insulating material (33), of higher dielectric permittivity; relatively small is taken to mean a thickness of insulator of less than the diameter (or than the largest width) of the electrode;
- the conductive channel (30) and the wide end (32) being in electrical continuity.

Experiments have shown that in this configuration, the higher the permittivity of the second insulating material, the higher the charge induced in the non-collecting electrode concerned, said permittivity being able to advantage to be higher than that of the detector material.

By way of example, a non-collecting electrode of this type is constituted by a wire made out of a conductive material. Such a conductive material is for example constituted by a metal or a highly doped semi-conductor. The insulating materials used for the respective sheaths of the channel (30) and the end (32) of each electrode are constituted by materials which have electrical conductivity several orders of magnitude less than that of the detector material. Their resistivity is preferentially higher than $10^{11}$ Ω·cm. By way of example, said insulating materials may be constituted by plastic material, such as Kapton® or zinc sulfide ZnS or AlN (aluminum nitride), or an oxide ($SiO_2$, oxide for GaN).

High permittivity insulators may be selected from: Hafnium dioxide ($HfO_2$), Zirconium dioxide ($ZrO_2$), Tantalum Pentoxide ($Ta_2O_5$), Aluminum trioxide ($Al_2O_3$), which have a permittivity of between 10 and 100, or PZT-based compounds (material with the chemical formula $Pb(Zr_x Ti_{1-x})O_3$), which may have permittivity of more than 100.

Silicon dioxide, currently used in the microelectronics field, and which has permittivity equal to 4, may also be used.

Low permittivity insulating materials may be selected from among porous $SiO_2$, Carbon doped porous SiO2, or again organic polymers known to those skilled in the art under the trademark SILK (Spin-on organic polymeric dielectrics), the latter being porous. The permittivity of these materials is generally between 2 and 2.5.

By field effect, the sensitive zone of each of these non-collecting electrodes is located in the vicinity of its tip, and over a distance which depends on the diameter and curve of the tip.

Each of these non-collecting electrodes is connected to its own measurement gage (51, 52, 53 and 54), but it is also conceivable for a plurality of non-collecting electrodes to be connected to a common measurement gage.

Figure 3:
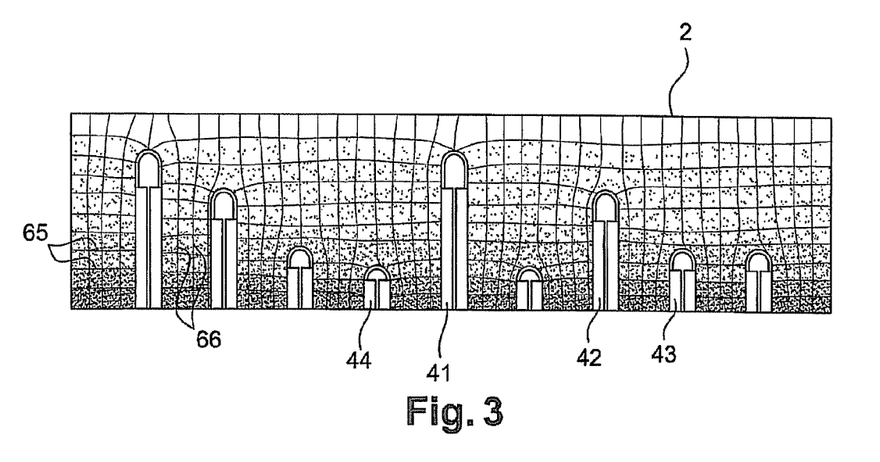
FIG. 3 is a schematic representation of a two-dimensional simulation of the field lines produced by a detector including a plurality of non-collecting electrodes of different lengths according to said first embodiment.

FIG. 3 shows a two-dimensional simulation of the field lines produced by a detector that includes a plurality of non-collecting electrodes of different lengths (41-44). The thickness of the detection material (2) is 500 micrometers. The anodes arranged in a plane, are brought to earth potential, while the cathode is brought to the potential −100 V.

The different shaded areas represent the potentials in the detector material (2), each shaded zone being delimited by isopotential lines (65) substantially parallel to the anode and to the cathode.

The field lines (66) are substantially perpendicular to the isopotential lines (65). The charge carriers migrate from the cathode to the anode along these field lines, thereby passing in proximity to the non-collecting electrodes. As can be seen, the field lines skirt round the non-collecting electrodes.

Figure 4A:
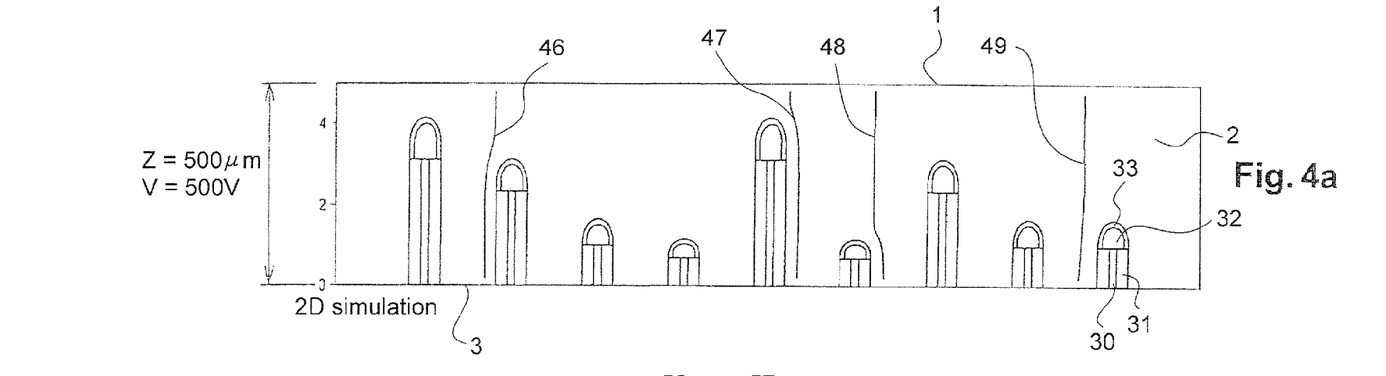
FIG. 4a is a schematic two-dimensional representation of the paths of the charge carriers within the detector according to the first inventive embodiment.
Figure 4B:
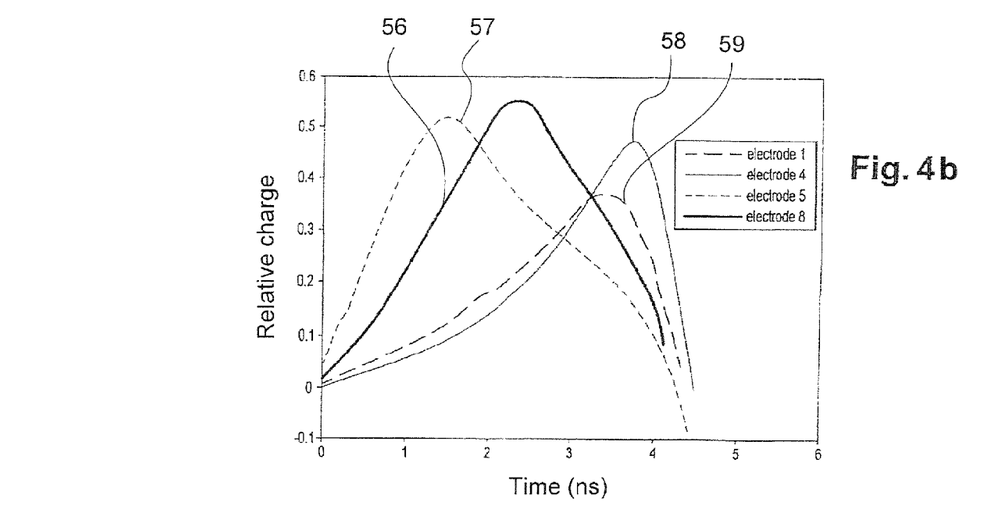
FIG. 4b represents the charge signal corresponding to said paths.
Figure 5A:
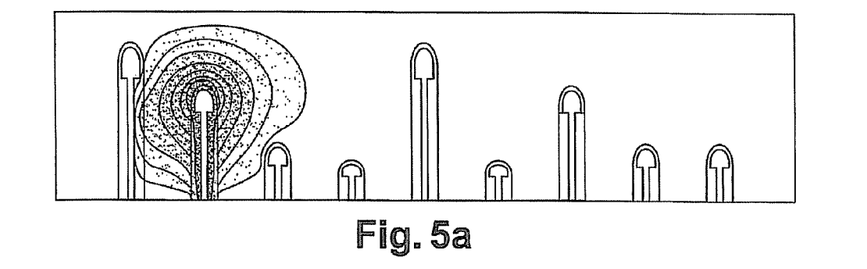
FIGS. 5a to 5d represent a two-dimensional simulation of the distribution of the weighting potential in the vicinity of a non-collecting electrode.
Figure 5B:
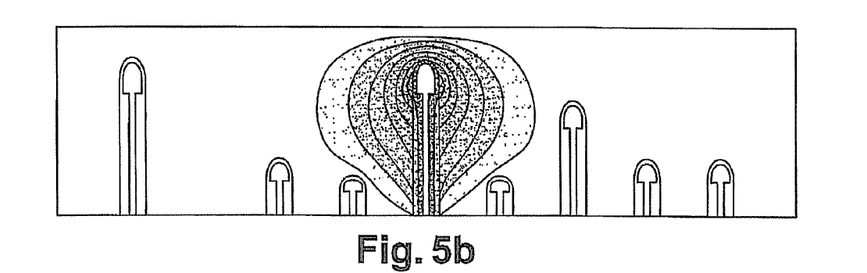
Figure 5C:
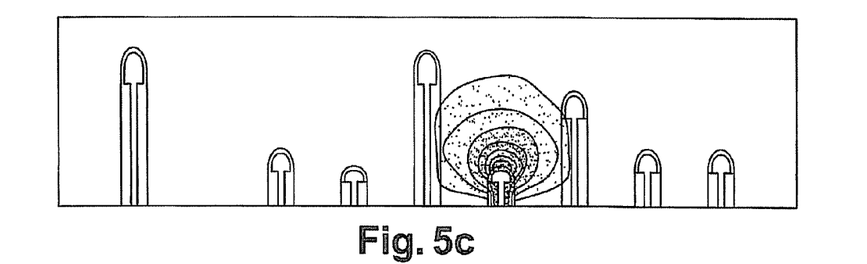
Figure 5D:
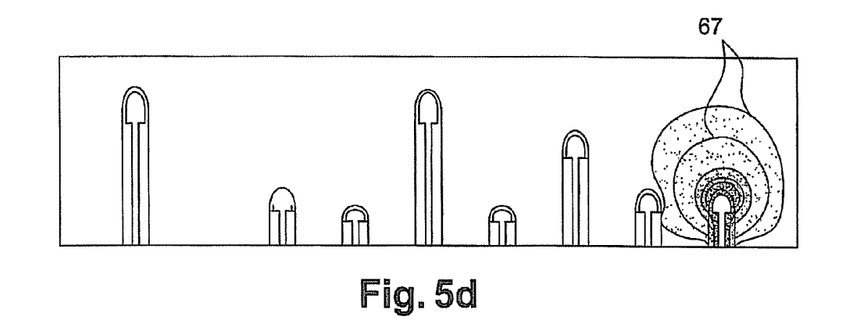

Referring to FIG. 4a, it may be observed the detector medium (2) represented in two dimensions, polarized by a cathode (1) (upper plane) and plurality of anodes (3) (lower plan). The trajectories 46, 47, 48, 49 of four negative charge carriers are shown. For each of these trajectories 46, 47, 48, 49, FIG. 4b shows the relative charge 56, 57, 58, 59 induced in the closest non-collecting electrode as a function of time, the electron being assumed in immediate proximity to the cathode at t=0. Trajectory 46 corresponds to charge 56, trajectory 47 corresponds to charge 57, trajectory 48 corresponds to charge 58, and trajectory 49 corresponds to charge 59. This simulation was carried out with Comsol software. It can be seen that the presence of the non-collecting electrodes has little effect on the path of the charge carriers and that the maximum relative charge induced is relatively large.

FIGS. 5a to 5d show a two-dimensional simulation of the distribution of the weighting potential in the vicinity of a non-collecting electrode. Said weighting potential is defined as the ratio of the charge induced in the non-collecting electrode to the charge carrier charge. The reference number (67) has been used to show the isopotential lines. The charge induced in a non-collecting electrode is all the higher when the charge carrier trajectory passes in proximity to the tip of the non-collecting electrode. This is then referred to as the tip effect, since the end of the non-collecting electrode may be likened to a tip.

It is also noted that the field lines have a shape influenced by their environment, and in particular by the neighboring electrodes, collecting or non-collecting.

Figure 6:
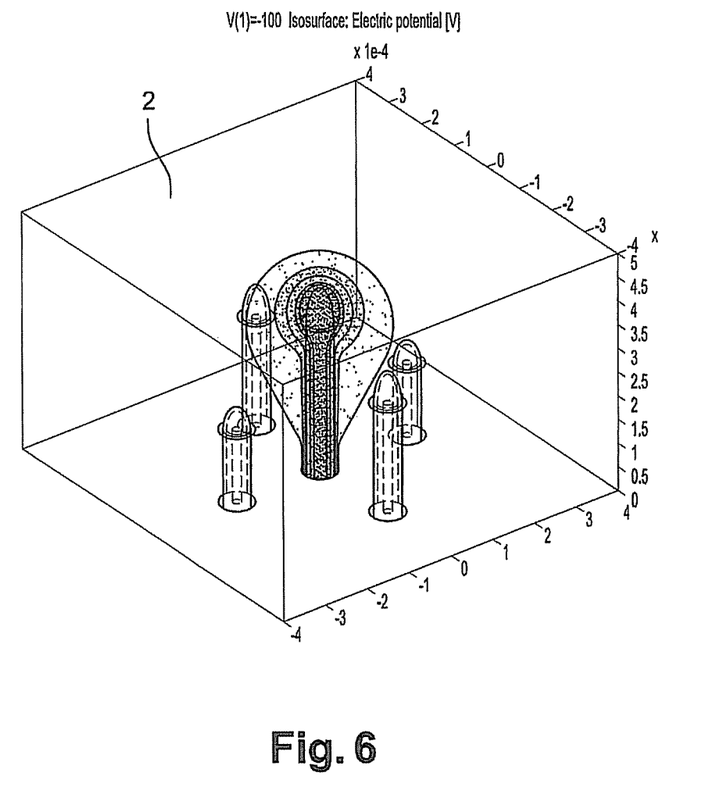
FIG. 6 is a representation of a 3D simulation, showing the three-dimensional distribution of the weighting potential in the vicinity of a non-collecting electrode.

FIG. 6 shows a 3D simulation, showing the distribution in three dimensions of the weighting potential in the vicinity of a non-collecting electrode. It is the planes at the bottom and top (not shown) which collect the electrons and the holes respectively. The tip effect previously described is then found.

In operating mode, an incident ionizing radiation, for example a X- or gamma ray photon (4), partially penetrates through the detector and, subsequent to its interaction with the material constituting the detector itself (2), a cloud of charge carriers is created and particularly electrons (5) and holes (not shown).

Under the electric field effect applied between the cathode (or cathodes) (1) and the anode (or anodes) (3), the cloud of charge carriers (5), for example electrons, drifts in the material (2) towards the anodes (3) in the case of electrons or towards the cathode (or cathodes) in respect of the holes. Passing in proximity to the tip of each non-collecting electrode (41-44), the cloud of charge carriers (5) induces a signal (61-64), shown on the left in FIG. 1, different for each of said non-collecting electrodes concerned. Indeed, because of the reduced charge carrying properties of the material (2), the signal induced in each of the non-collecting electrodes decreases during the migration of the cloud of electrons (5) towards the anodes (3), also because of the difference in height of each of said non-collecting electrodes. This state of affairs has actually been shown in FIGS. 4a and 4b.

Passing in proximity to the tip of said non-collecting electrodes, the cloud of charge carriers (5) generates induced charges corresponding to the signal (61, 62, 63, 64), dependent on the charge carried. Measuring said charges induced in the non-collecting electrodes in fact allows an interaction to be detected. By straightforward means, it then becomes possible to determine the non-collecting electrode situated closest to the point of interaction. These means, known to those skilled in the art, may for example be constituted by:

- a current amplifier connected in series to one or more comparators, so that the induced current strength can be compared relative to a threshold,
- a charge amplifier, for measuring the charge,
- means for selecting the first electrode that produces a significant signal,
- means for attributing a date to each signal produced.

In doing this, the invention as implemented via this particular embodiment, makes it possible to obtain accurately the X, Y, and Z coordinates of the point where the incident photon interacts with the detector.

To advantage, the space between each of these non-collecting electrodes is optimized so as to minimize dead zones, in other words zones corresponding to a volume inside which an interaction induces no signal.

Additionally, because of this configuration, a signal may be measured on a non-collecting electrode even when the charges are trapped in the course of their migration and do not reach said first or second sets of electrodes, in other words the cathode or the anodes.

According to one advantageous feature of the invention, the height differential between two non-collecting electrodes is preferentially less than the mean free path of the charge carriers within the detector material (2) under consideration. In fact, a number of different heights for the non-collecting electrodes is selected greater than the ratio between the detector thickness and the mean free path of the charge carriers.

For example, a detector material constituted by Gallium Arsenide (GaAs), the electrons having a mobility of about 4000 $cm^2/V/s$, and an average life cycle of 5 ns, the mean free path of an electron is about 200 micrometers. According to the geometry described in FIG. 1, a height pitch of 100 micrometers may be chosen if the cloud of charges is required to be seen at least once. In medical applications based on an average X-ray detection energy of 60 keV, the thickness of a detector plane constituted by such a material is substantially equal to 1 millimeter. Nine collecting electrode heights can then be distinguished, between 100 and 900 micrometers in 100 micrometer stages. There is thus an even mosaic along the whole plane of the detector.

It has been shown previously that with each non-collecting electrode was associated a measurement gage. In one alternative, non-collecting electrodes with the same feature, and particularly the same height, can be connected by macro-pixel interconnection, which is done in the interests of reducing the number of measurement gages thereby simplifying detector implementation.

It is also conceivable for an interconnection to be made between electrodes, in order to reduce the number of measurement gages, for example by using the connection principle described in the document FR 2 887 993 already mentioned.

Detectors in accordance with this first form of embodiment may be implemented in two different ways.

According to a first mode of manufacture, the starting point is a solid substrate of the detector material in which holes are made by mechanical drilling (using a drill), thermal drilling (using a laser), sublimation (here too by laser), by chemical means, plasma, or by any other process suited to the material, dimensions and high form factors. Preferably, the front and rear faces of the detector are protected by lithography resins commonly used in microelectronics. In the case of chemical or plasma drilling, a pattern of holes is made in the resin by exposure, using a photolithography method. In the case of drilling operations using mechanical or thermal methods, the surfaces of the detector may be protected, but the photolithography stage is not required.

An insulator is then deposited onto the walls of each hole, for example by sputtering, evaporation, or by chemical means. A conductive material is then deposited on the inside against the sides of this cavity, by sputtering, evaporation or electrochemical growth.

The electrodes are then implemented in accordance with the following stages

Figure 7:
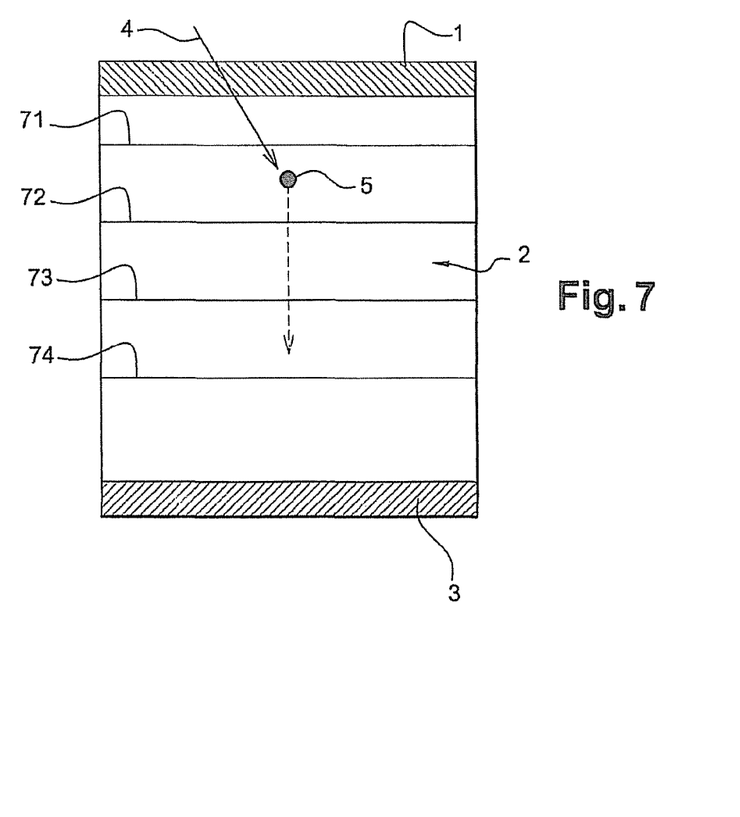
FIG. 7 is a schematic cross-section representation of a second inventive embodiment.
Figure 8:
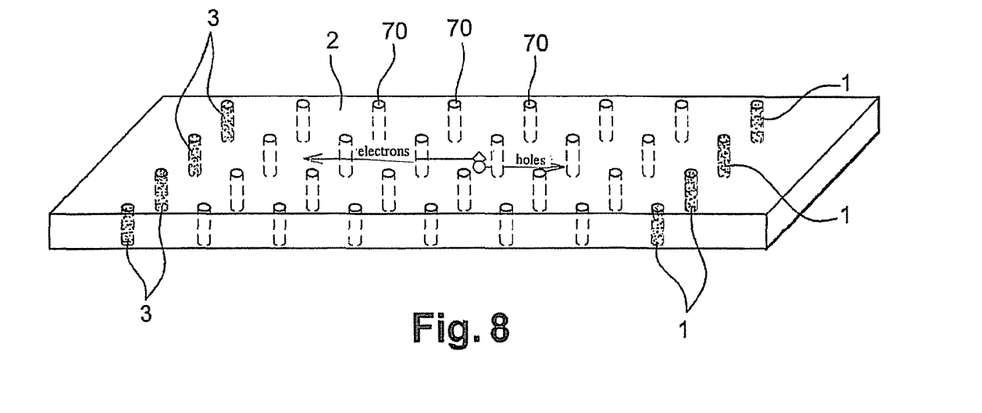
FIG. 8 is a schematic partial perspective representation of said second embodiment.

- laser machining of holes of given depth (the full depth);
- filling of said holes with the high permittivity insulator, up to the electrode head;
- machining of a hole in the shape of the electrode head: diameter smaller than the first machining, and allowing a certain thickness of insulator to be left at the bottom;
- filling the trough so formed with metal;
- filling the rest of the hole with the low permittivity insulator;
- machining anew the shape of the electrode foot;
- filling with metal Another embodiment of the invention is described in relation to FIG. 7. In this, the non-collecting electrodes (71-74) are buried in the detector material (2), this time not parallel to the electric field but perpendicular thereto. To advantage, said non-collecting electrodes pass through the detector material (2) over the entire surface thereof. They therefore extend parallel relative to the planes formed by the cathode (1) and the anodes (3). They are longilinear in shape.

Under the effect of the polarization electric field generated between the cathode (1) and the anodes (3), the cloud of electrons (5) generated subsequent to the interaction of a photon (4) within the material (2) migrates and generates induced charges in the neighboring non-collecting electrodes. Here too, said non-collecting electrodes are each connected to a measurement gage, so that it becomes possible to detect the aforementioned interaction, even if the charge carriers generated by the interaction do not reach the polarizing electrodes (1) and (3).

It also becomes possible to have spatial information about the interaction point by detecting the signal corresponding to the signal detected by the closest non-collecting electrodes. The spacing between the non-collecting electrodes is chosen in such a way as to be less than the mean free path of the charge carriers within the detection material (2).

Contrary to the first embodiment, the effective zone of the non-collecting electrodes is not constituted by their tip, but by their entire length. The geometry of said non-collecting electrodes is also different from those described in the first embodiment: the thickness of the insulating sheath is constant, and the constituent material of this sheath may be identical over the entire length of the sheath.

The mode of manufacturing this second embodiment is identical to the previous one, the holes made in the detector material preferentially being through holes.

Consequently, as may be imagined, implementing the invention means first of all that spatial information about the interaction point is delivered in a straightforward way, and on the other hand that detection materials can be employed that have hitherto been unusable on account of the reduced length of the charge carrying, and are therefore less expensive.

Simulations have been made allowing the charge induced in a through non-collecting electrode, according to the second embodiment, to be evaluated. Said simulations are shown in relation to FIGS. 9 to 13.

Figure 9:
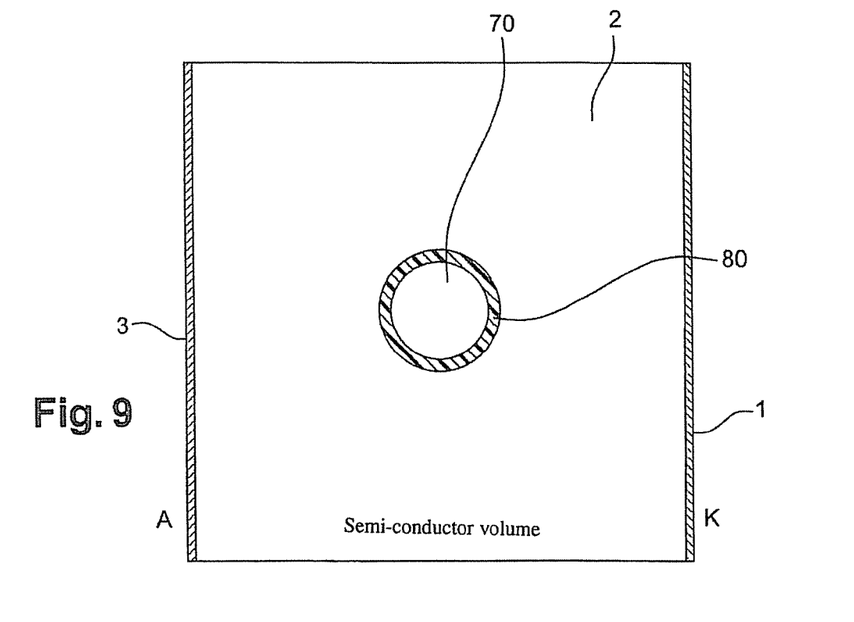
FIG. 9 represents diagrammatically a solid detector in cross-section in accordance with the second inventive embodiment, wherein a single non-collecting electrode has been shown.

FIG. 9 shows a solid detector, in which can be distinguished the polarization electrodes (cathodes and anodes), and a non-collecting electrode (70), arranged perpendicular to the electric field resulting from the polarization. Said non-collecting electrode is insulated from the radiation sensitive material by a jacket made out of an insulating material (80).

In this figure, and as a non-restrictive example, the non-collecting electrode is placed parallel to the anode and to the cathodes.

Figure 10:
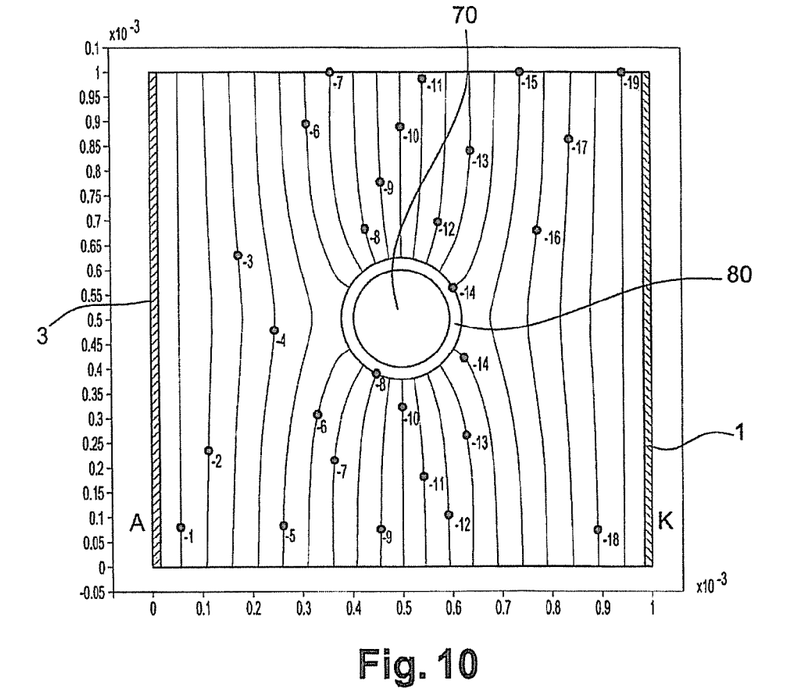
FIG. 10 shows the different isopotential lines of the detector in FIG. 9.

FIG. 10 shows the different isopotential lines, certain numerical values representing potential values being given by way of example. The detector material is made out of 1 millimeter thick CdTe, subjected to a 20 V/mm electric field, with no account being taken of charge carrier trapping.

Figure 11:
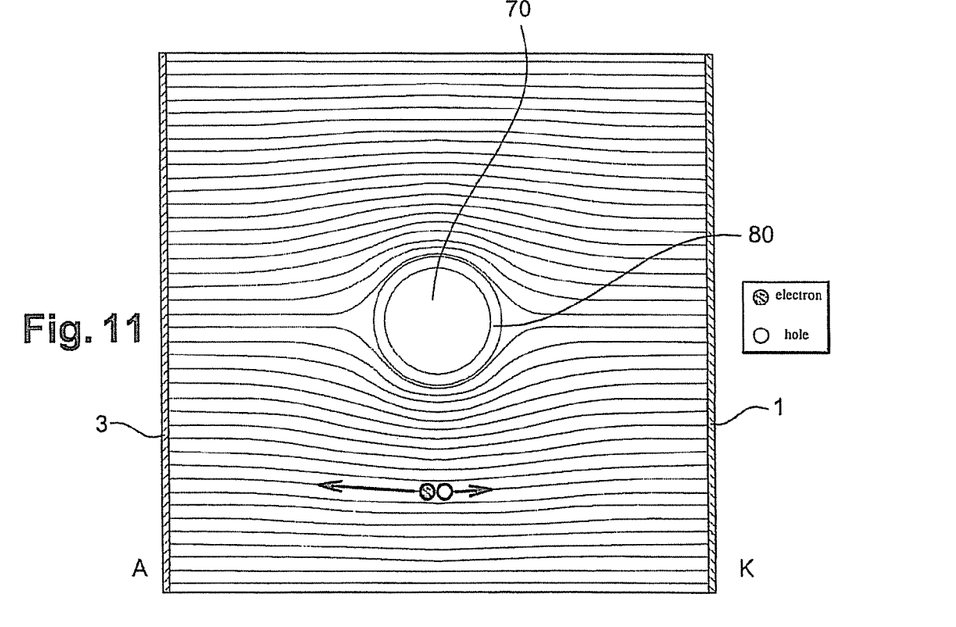
FIG. 11 shows the electric field lines of the detector in FIG. 9, also showing the trajectories followed by the charge carriers during their migration.

FIG. 11 shows the electric field lines, also apart from the trajectories followed by the charge carriers in the course of their migration.

Figure 12:
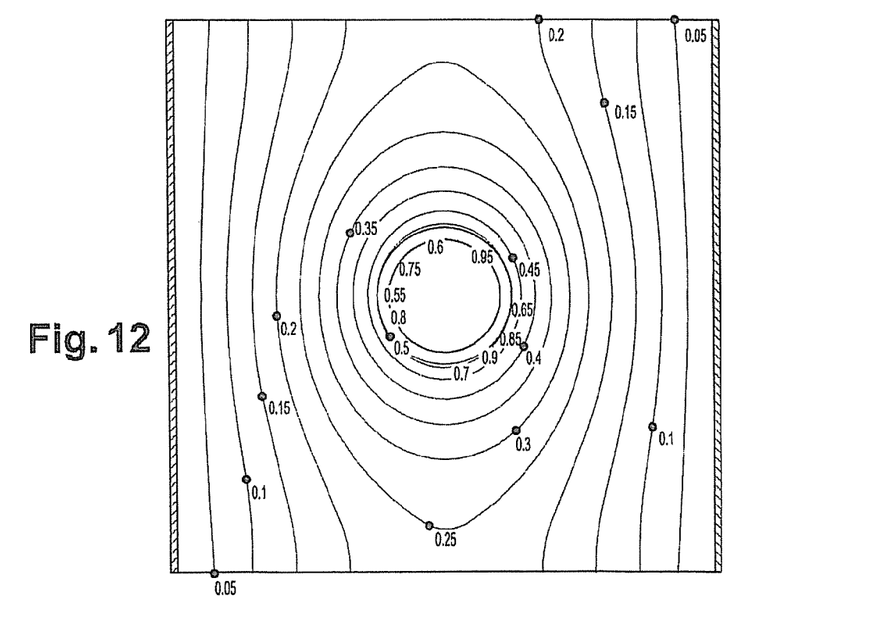
FIG. 12 shows the weighting potential on a non-collecting electrode of the detector in FIG. 9 as a function of the position of the charge carrier in the detector.

FIG. 12 shows the weighting potential on a non-collecting electrode as a function of the position of the charge carrier in the detector. As already indicated, the weighting potential may be defined as the ratio between a charge induced in the non-collecting electrode by all the charge carriers created by an interaction, throughout their course in the detector material, and the charge created by said interaction. It is here between 0 (the carriers generate no induced charge) and 1 (the induced charge is equal to the carrier charge)

An electron hole pair created in immediate proximity to the non-collecting electrode will migrate by passing through the entire zone of influence of this electrode and induce a signal on the electrode equal to 100% of the charge of the electron hole pair equal to once the charge of said pair. Likewise, a free carrier, electron or hole, will end its course by being absorbed on the anode or on the cathode. No signal will be able to be induced on the central electrode from that moment on. The weighting potential of the anode and of the cathode is therefore zero.

This also means that, if trapping is not taken into account, an electron hole pair created on the line where the weighting potential is 0.3 induces a signal corresponding to 0.3*the charge of the electron hole pair (0.3*the charge of the electron+0.3*the charge of the hole).

This simulation was implemented using COMSOL software, the detector material being 1 millimeter thick CdTe, subjected to a 20 V/mm electric field, with no account being taken of charge carrier trapping.

Figure 13:
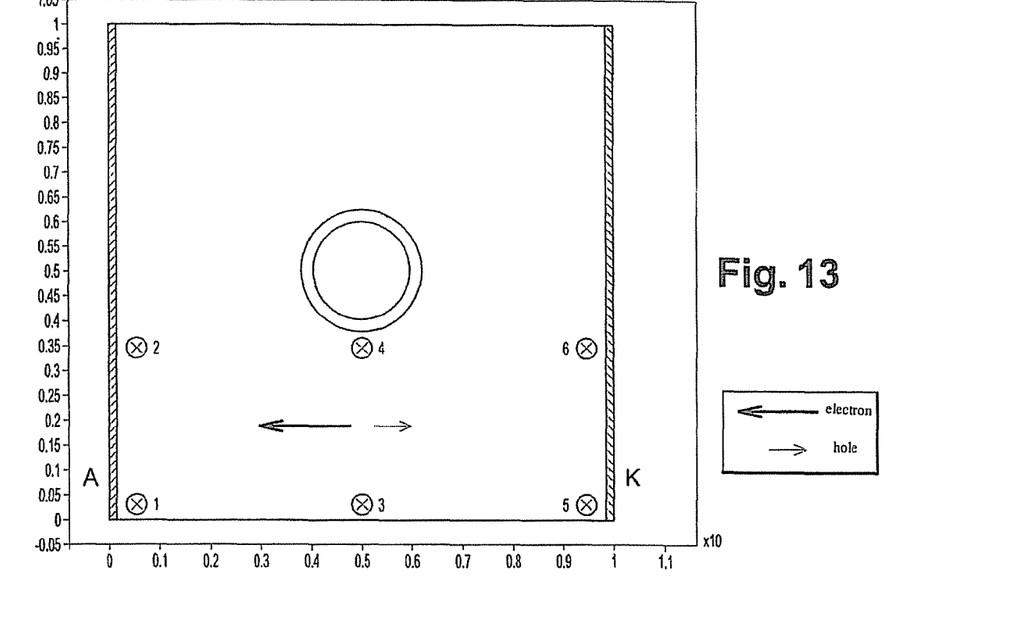
FIG. 13 is a schematic diagram representing the charges induced on the non-collecting electrode by an interaction with the solid detector of FIG. 9 in different places of said detector.
Figure 14:
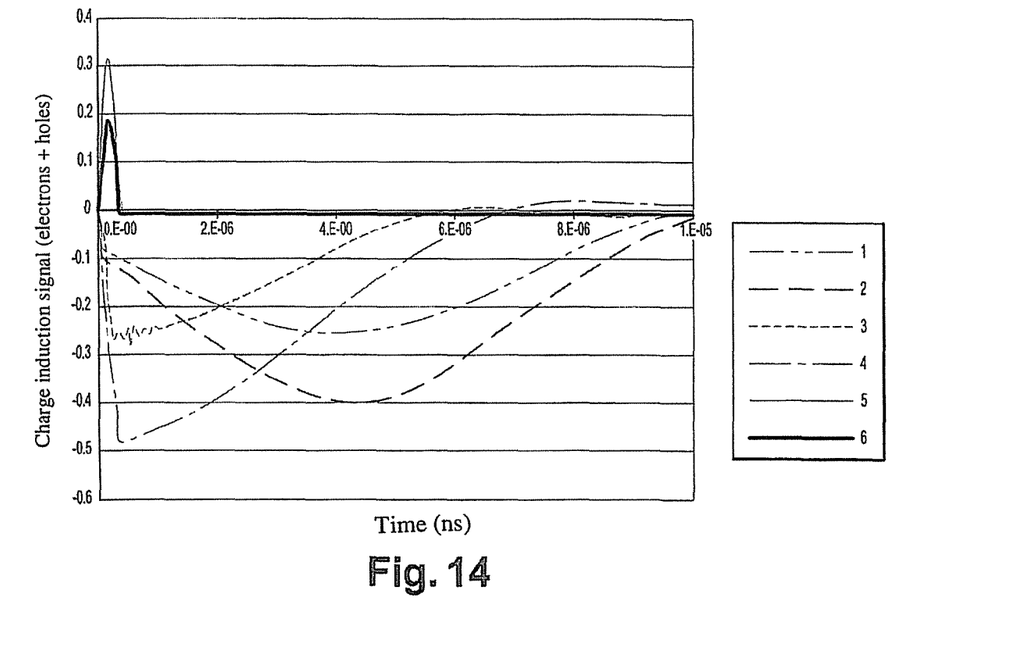
FIG. 14 shows the time signals for the induction of charges the non-collecting electrode shown on the detector in FIG. 9, for different interaction positions embodied in said FIG. 13.

FIGS. 13 and 14 show the charges induced on the non-collecting electrode by an interaction that releases an electron hole pair in different places in the detector material, with no account being taken of trapping (or long life cycle of the carrier).

Thus, the interactions bearing the reference numbers 1 and 2, situated in proximity to the anode, generate in the non-collecting electrode, a signal that is negligible due to the electrons. The signal due to the holes increases the closer the carriers get to the non-collecting electrode, and then decreases the further away they get. The induced signal gets bigger as the charge carriers migrate along a field line situated in proximity to the non-collecting electrode.

The interactions bearing the reference numbers 3 and 4 occur in proximity to the non-collecting electrode. Since the mobility of the electrons is greater than that of the holes, the signal breaks down into a contribution of very fast electrons, and then into a contribution of much slower holes.

The interactions bearing the reference numbers 5 and 6 occur near the cathode. The signal due to the hole is negligible, while the electronic signal increases and then decreases, very quickly, as the mobility of the electrons is far greater than that of the holes in the detector material under consideration. The graph in FIG. 12 shows that, in this configuration, the non-collecting electrode detects a signal during a period of about 100 ns following an interaction.

The result of this graph is that the point where the incident photon interacts can be accurately located.

The invention previously described relates to semi-conductor detectors in which the most mobile charge carriers are electrons, but those skilled in the art will understand that this invention may also be applied in semi-conductor materials in which advantage can be taken of the carrying properties of the holes. This means for example InP (Indium Phosphate) or some semi-conductor polymers.

The invention claimed is:

1. A device for detecting ionizing radiation including a first set of electrodes, a solid detector material sensitive to ionizing radiation, capable of interacting therewith by releasing electron and electron hole mobile charge carriers, and a second set of electrodes, said first and second sets of electrodes being polarized in such a way that an electric field is applied through the detector material, thereby allowing the charge carriers generated by the interaction between the detector material and the ionizing radiation to migrate, wherein the device further includes electrically insulated electrodes, known as non-collecting electrodes, and positioned in the volume of the detector material subjected to the electric field, and capable, by capacitive effect, of detecting the charges induced by the migration of the charge carriers in the volume of the detector subjected to the electric field, said non-collecting electrodes being connected to one or more measurement devices for reading and recording said induced charges.

2. The device for the detection of ionizing radiation as claimed in claim 1, wherein the non-collecting electrodes are separated from the detector material by an electrically insulating layer.

3. The device for the detection of ionizing radiation as claimed in claim 1, wherein each non-collecting electrode is constituted by:
- a conductive channel in electrical continuity with one of said sets of electrodes, and insulated from the detector material by means of a first thickness of a first insulating material of low dielectric permittivity;
- an end of short length relative to the length of the channel and of width or diameter larger than that of the channel, also made out of a conductive material and in electrical continuity with the channel, said end being insulated from the detector material by means of a second insulating material, of dielectric permittivity higher than that of said first insulating material but of smaller thickness than the latter,
wherein the length of the conductive channels varies over a set of all conductive channels.

4. The device for the detection of ionizing radiation as claimed in claim 3, wherein the thickness of the first insulating material is close to the diameter or the width of the non-collecting electrode.

5. The device for the detection of ionizing radiation as claimed in claim 3, wherein the thickness of the second insulating material is less than the diameter or the width of the non-collecting electrode.

6. The device for the detection of ionizing radiation as claimed in claim 3, wherein the relative dielectric permittivity of the first insulating material is between 1 and 4, and wherein the relative dielectric permittivity of the second insulating material is between 4 and 13.

7. The device for the detection of ionizing radiation as claimed in claim 6, wherein the relative dielectric permittivity of the first insulating material is about 2.

8. The device for the detection of ionizing radiation as claimed in claim 6, wherein the relative dielectric permittivity of the second insulating material is as close as possible to that of the detector material.

9. The device for the detection of ionizing radiation as claimed in claim 3, wherein the first insulating material is selected from the group comprising plastic materials, zinc sulfide ZnS, aluminum nitride AlN, silicon oxides $SiO_2$, whether or not carbon-doped.

10. The device for the detection of ionizing radiation as claimed in claim 3, wherein the second insulating material is selected from the group comprising Hafnium dioxide ($HfO_2$), Zirconium dioxide ($ZrO_2$), Tantalum Pentoxide ($Ta_2O_5$), Aluminum trioxide ($Al_2O_3$), and PZT-based compounds ($Pb(Zr_{x-}Ti_x)O_3$).

11. The device for the detection of ionizing radiation as claimed in claim 1, wherein each non-collecting electrode is connected to its own measurement gauge, the measurement gauge connected to a signal processing system.

12. The device for the detection of ionizing radiation as claimed in claim 1, wherein the non-collecting electrodes with the same feature are interconnected.

13. The device for the detection of ionizing radiation as claimed in claim 1, wherein the non-collecting electrodes are arranged parallel to the electric field and have different lengths, the free end of said electrodes being situated in the detector material.

14. The device for the detection of ionizing radiation as claimed in claim 1, wherein the non-collecting electrodes are arranged parallel to the first and second sets of electrodes, and therefore perpendicular to the electric field, and in one or more parallel planes.

15. The device for the detection of ionizing radiation as claimed in claim 14, wherein the non-collecting electrodes extend along the entire plane of the detector material and are therefore through electrodes.

16. The device for the detection of ionizing radiation as claimed in claim 1, wherein the non-collecting electrodes with the same dimensional feature are interconnected.

* * * * *